Aug. 11, 1953     W. L. ADKINS     2,648,306
DRINKING FOUNTAIN VALVE
Filed May 31, 1950
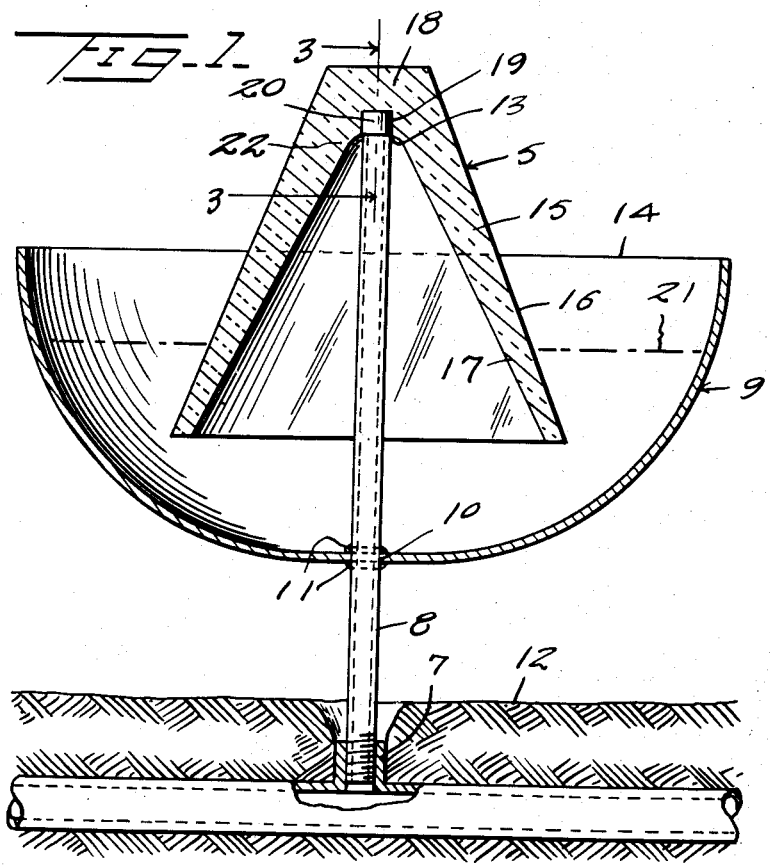
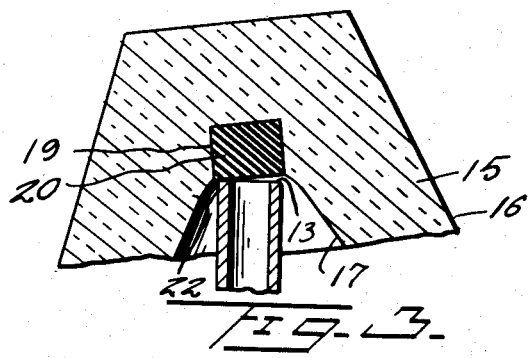
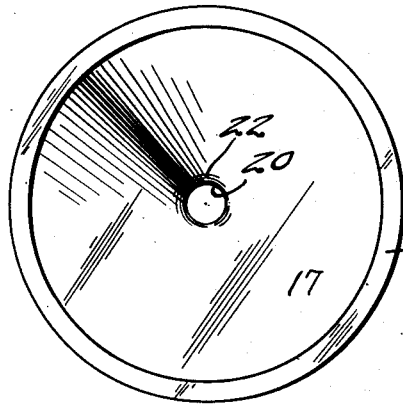
Inventor
William L. Adkins
By John N. Randolph
Attorney Patented Aug. 11, 1953

2,648,306

UNITED STATES PATENT OFFICE 2,648,306

DRINKING FOUNTAIN VALVE

William L. Adkins, Downey, Calif.

Application May 31, 1950, Serial No. 165,272

7 Claims. (Cl. 119—75)

This invention relates to a novel valve for drinking fountains or troughs intended for use by livestock and poultry and more particularly to a valve which normally closes the discharge end of a water supply conduit of a drinking trough or receptacle and which is so constructed and arranged that when the supply of water in the trough or receptacle becomes low livestock or poultry in attempting to reach the water will engage and rock the valve body for momentarily opening the valve to replenish the supply of water in the drinking receptacle to thus provide a poultry or livestock operated valve of extremely simple construction and which will function automatically to maintain water in a drinking receptacle at a proper level without the use of float means or other complicated structure.

Still another object of the invention is to provide a valve for drinking fountains having a body portion forming a shield for deflecting the water from the discharge end of a supply pipe into a drinking receptacle, with which the valve is associated, when said valve is in an open position.

A further object of the invention is to provide a valve of extremely simple construction which may be very economically manufactured and sold and which is supported in an applied position solely by its weight enabling it to be removed and replaced at any time.

Another and important object of the present invention is to provide a valve structure which will not become clogged by small particles of dirt or trash and which is so constructed that when in an open position the discharge end of a water supply pipe, with which the valve is associated, will be sufficiently exposed to clean out any dirt which might have accumulated adjacent the valve.

Various other objects and advantages of the invention will hereinafter become more fully apparent from the following description of the drawing, illustrating a presently preferred embodiment thereof, and wherein:

Figure 1 is a central vertical sectional view, partly in side elevation, showing a poultry or livestock drinking fountain with the valve applied thereto and in a closed position;

Figure 2 is a bottom plan view of the valve, and

Figure 3 is an enlarged vertical sectional view of the upper portion of the valve and the discharge end of a water supply pipe showing the valve in an open position.

Referring more specifically to the drawing, for the purpose of illustrating one application of the novel drinking fountain valve, comprising the invention and designated generally 5, a portion of a water main is shown at 6 disposed in an underground position although it will be readily apparent that the water main 6 could be disposed above ground, if desired. The water main 6 has an upwardly extending internally threaded boss 7 forming one outlet thereof. A branch discharge pipe 8 has an externally threaded end 8a which threadedly engages in the boss 7 and which is supported thereby in an upright position.

An open top trough or drinking receptacle 9 of any desired size and shape, preferably circular in top plan, has an opening 10 in the bottom thereof through which the pipe 8 extends. The opening 10 snugly engages around a portion of the pipe 8 and the trough bottom is secured to said pipe portion in any suitable manner as by soldering or welding, as seen at 11 to provide a liquid tight connection between the pipe and the opening 10. It will thus be seen that the receptacle 9 is supported by the pipe 8 with its open top substantially in a horizontal plane and with its bottom disposed at any suitable level above the ground as indicated at 12, convenient for feeding livestock or poultry. The upper, open discharge end 13 of the pipe 8 is preferably but not necessarily disposed above the level of the open top 14 of the receptacle 9.

The control valve 5 constitutes a body portion 15 which may be formed of any suitable, preferably nonbuoyant material, such as glass and which is preferably but not necessarily frustoconical in shape, externally as seen at 16 and internally as seen at 17. The upper restricted end 18 of the valve body 15 is provided with a downwardly opening recess 19 which is disposed centrally of the longitudinal axis of the body 15 and in which is suitably secured a block 20 of a resilient material such as rubber which fills the recess 19 and which defines the upper, closed end of the hollow interior 17 of the body 15. As the description proceeds it will be readily apparent that the body 15 may be formed of various materials, may be of various shapes and that the annular tapered wall thereof need not be solid as illustrated.

The valve body 15 is applied over the upper end of the pipe 8 and the valve element or block 20 engages on the upper open end 13 of the pipe 8 and is of sufficient size to completely engage said end 13 for supporting the valve body 15 in an upright position. The valve body 15 is of sufficient length so that its open lower end extends a substantial distance into the receptacle 9 but is spaced sufficiently from the bottom and side portions of said receptacle so that the valve 15 may be rocked on the upper end 13 of the pipe 8 as a fulcrum, as illustrated in Figure 3, without any part of the valve body 15 contacting the receptacle 9.

The valve 5 is of sufficient weight so that it will withstand the pressure of the water in the pipe 8 and retain its position of Figure 1 for sealing the discharge end 13 and may obviously vary in weight and size depending upon the pressure in the main 6 and pipe 8. The water level as indicated by the broken line 21 in Figure 1 will vary depending upon whether the drinking fountain is used by poultry or livestock and also depending upon the relative size of the receptacle 9 and valve body 15. However, as the water is consumed from the receptacle 9 and drops relatively to the open top of said receptacle, the available space between the receptacle 9 and the valve body 15 will be reduced in width so that either before or after the water level falls below the level of the open bottom of the valve body 15, poultry or livestock in attempting to reach the water will strike the outer side 16 of the valve body 15 with their heads and in so doing will cause the valve 15 to rock on the upper pipe end 13 as a fulcrum to thus expose a part or all of the discharge end 13 of the pipe 8 to allow water to escape therefrom. The hollow interior 17 of the body 15 will then function as a shield for directing this water downwardly into the receptacle 9 for replenishing the supply of water therein and for raising the water level. Thus, the water will be maintained at nearly a constant level in the receptacle 9. Obviously, as previously mentioned, the upwardly tapered annular wall of the body 15 need not be solid and the body 15 does not necessarily have to be annular in shape but may vary in shape depending upon the shape of the receptacle 9. The upwardly tapered inner surface 17 of the body 15 will function to guide said body as it is lowered onto the upper end 13 of the pipe 8 so that the block or valve element 20 will come to rest upon the pipe end 13. The surface 17 is flared slightly as seen at 22 around the block 20 to afford sufficient clearance for escape of the water when the valve is tilted, as seen in Figure 3.

Various modifications and changes are contemplated and may obviously be resorted to, without departing from the spirit or scope of the invention as hereinafter defined by the appended claims.

I claim as my invention:

1. In combination with a drinking receptacle having an open top and a supply pipe extending upwardly through the receptacle and having an upwardly opening discharge end, a valve body having an upper closed end, said valve body having a downwardly opening hollow interior into which the upper end of the water supply pipe extends, said valve body having a downwardly facing substantially flat surface adjacent its upper extremity and remote to the lower end of the valve body defining the upper closed end of the hollow interior, said surface normally resting on and closing the upper discharge end of the supply pipe, said valve body being supported solely by the supply pipe and being of sufficient weight to withstand the pressure in the supply pipe for normally closing and sealing the discharge end thereof, the lower end of said valve body extending into the receptacle and being spaced therefrom for rocking movement of the valve body on the discharge end of the supply pipe as a fulcrum for unsealing said discharge end to admit water to the receptacle, the preponderance of the weight of the valve body being disposed below the discharge end of the supply pipe whereby the valve body is gravity urged from a tilted open position to an upright closed position.

2. A valve as in claim 1, a block of resilient material embedded in the upper portion of said valve body and having a surface defining the upper end of the hollow interior of the valve body and which normally engages and seals the discharge end of the supply pipe.

3. A valve as in claim 1, said valve body being substantially frusto-conical in shape and having a substantially frusto-conical shaped recess therein the annular tapered wall of which functions to guide the valve body to position the surface defining the upper end of said recess on the discharge end of the supply pipe.

4. A valve as in claim 3, said valve body being formed of a non-buoyant material.

5. The combination with an upwardly opening water supply pipe containing water under pressure and a drinking receptacle disposed therebeneath and having an open top, of a valve member having a downwardly opening recess tapered upwardly toward the upper, closed end of said valve member and having a substantially flat surface defining the upper closed end of said recess, said flat surface being disposed adjacent the upper extremity of the valve body and substantially above the center of gravity thereof, said valve member being normally maintained by gravity with its substantially flat surface engaging flush against the discharge end of the water supply pipe for closing and sealing said discharge end, said supply pipe forming the sole support for the valve body, and said valve member being mounted to rock on the discharge end of the supply pipe as a fulcrum in any direction for rocking the flat surface of the valve member out of flush engagement with said discharge end of the pipe to unseal said discharge end to permit water to be discharged therefrom for refilling the receptacle disposed therebelow.

6. A valve as in claim 5, said valve member extending downwardly from the discharge end of the supply pipe into the receptacle and being supported by the supply pipe out of contact with the receptacle.

7. A structure as in claim 5, and a block of a cushioning and sealing material embedded in said valve member and having a surface defining the upper substantially flat surface which engages on the discharge end of the supply pipe.

WILLIAM L. ADKINS.

References Cited in the file of this patent

UNITED STATES PATENTS

| Number | Name | Date |
| --- | --- | --- |
| 326,829 | Balch | Sept. 22, 1885 |
| 1,702,973 | Lord | Feb. 19, 1929 |
| 1,939,176 | Leiman | Dec. 12, 1933 |
| 2,319,928 | Hart | May 25, 1943 |
| 2,387,664 | Kubista | Oct. 23, 1945 |
| 2,510,252 | Pine | June 6, 1950 |

FOREIGN PATENTS

| Number | Country | Date |
| --- | --- | --- |
| 313,267 | Italy | Dec. 21, 1933 |